No. 878,989. PATENTED FEB. 11, 1908.
H. B. NEWHALL.
CHAIN.
APPLICATION FILED JUNE 8, 1906.
*Fig. 1,*
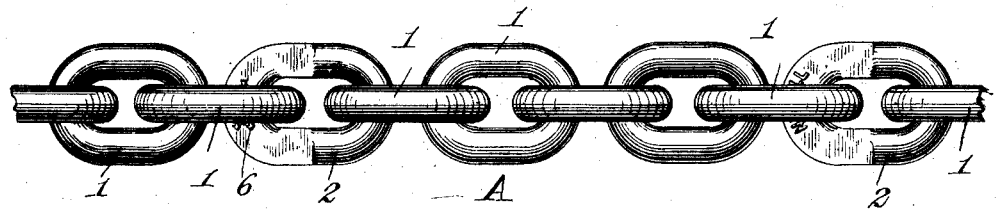
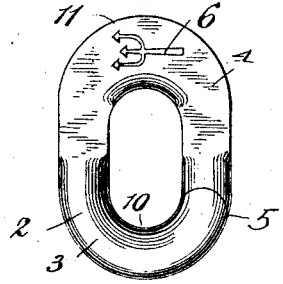
*Fig. 2,*
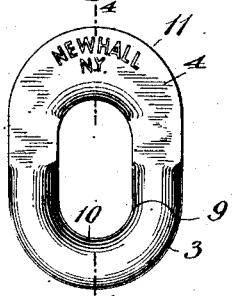
*Fig. 3,*
*Fig. 4,*
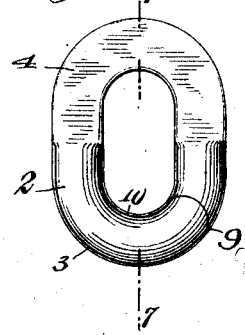
*Fig. 5,*
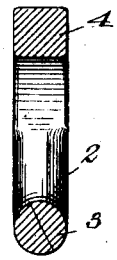
*Fig. 6,*
WITNESSES:
INVENTOR
Henry B. Newhall
BY Duncan & Duncan
ATTORNEYS

UNITED STATES PATENT OFFICE.

HENRY B. NEWHALL, OF PLAINFIELD, NEW JERSEY.

CHAIN.

No. 878,989.  Specification of Letters Patent.  Patented Feb. 11, 1908.

Application filed June 8, 1906. Serial No. 320,688.

*To all whom it may concern:*

Be it known that I, HENRY B. NEWHALL, a citizen of the United States, and a resident of Plainfield, in the county of Union and State of New Jersey, have invented certain new and useful Improvements in Chains, of which the following is a specification, taken in connection with the accompanying drawings, which form a part of the same.
This invention relates to an improvement in chains which permits a manufacturer when a defective chain is returned to him, to be replaced under a guarantee express or implied, to determine from a glance at the chain itself whether or not the claim is a just one.

In the accompanying drawings showing illustrative embodiments of this invention in which the same reference numeral refers to similar parts in the several figures, Figure 1 is a side elevation of a chain made in accordance with my invention. Fig. 2 is a plan view of one of my identifying links. Fig. 3 is a plan view of the same link reversed showing the plain surfaces arranged at an angle to each other, as is more clearly shown in Fig. 4. Fig. 4 is a vertical section on the line 4—4 of Fig. 3. Fig. 5 is a plan view of another form of identifying link; and Fig. 6 is a vertical section of Fig. 5 on the lines 7—7.

In the illustrative embodiments of this invention shown in the drawings, A is a chain made up of links 1, 1 and identifying links 2, 2. In making the chain I preferably use round stock and weld the ends of the links together as shown at 5 and 9, Figs. 2 and 3. At suitable intervals of approximately five or ten feet, though this may be varied without departing from my invention, I work into the chain an identifying link, such as 2, approximately one-half of which, the portion 3, is round in cross-section, as shown in Fig. 4, and the other half 4 of the link I flatten to form the enlarged portion 11 having its plain surfaces arranged at an angle to each other as shown in Figs. 2, 3 and 4. The peculiar contour of the body of this link is such that ordinarily it alone is sufficient to identify the chain of which it is a part. By body I mean the two sides and the two ends of the link. I may, however, stamp into one of the flattened portions of the link a mark such as a trident, 6, shown in Fig. 2 and upon the other surface the name of the maker, as Newhall, N. Y., Fig. 3. These designating marks, however, may be omitted and the identifying link left blank as in Figs. 5 and 6, where the lower portion of the link is shown circular in cross-section and the upper flattened portion square.

My improvement is particularly adapted for loading and coil loading chains which as well known in the art are chains adapted to do heavy work and to be readily wound around a drum suitably actuated to place strain upon the chain.

It is found in practice that a great many claims, under a guarantee to replace defective chains, are made based upon returned chains which do not properly come under the guarantee. After a chain has been used for a considerable time under service conditions where it is often subjected to the action of water and mud and becomes covered with a thick coating of rust, it is often impossible to determine whether the chain or the portion of the same returned, has been made by the person who is requested to replace it or by some other manufacturer and this has led to some chains being unjustly replaced by a person who did not manufacture the original. On the other hand, manufacturers have refused to replace a chain which it could be established by extraneous evidence was in fact manufactured by him and covered by the terms of his guarantee. By my invention I rely upon identifying links having a body of special configuration from that of the other links of the chain and inserted at proper intervals. The difficulty above mentioned can be at once overcome by requiring the return of a length of chain at least equal to the distance between the identifying links; it would then be immaterial how rusty the links of the returned chain were for the body of the identifying link will itself enable the positive identification of the chain.

Though I preferably use round stock in the manufacture of my chain I may use square stock such as shown in section in Fig. 6 and subsequently work it to make the round links, omitting, at intervals, to round approximately one-half of one of the links so as to form the distinctive identifying links in the chain. Though I have shown the body of the identifying link made up of approximately two equal portions, one flat and one rounded, I do not desire to be limited to this proportion of the parts or this contour of the link as it may be of any regular or irregular contour different from that of the other links.

Having thus described this invention in connection with several illustrative embodiments thereof, to the details of which I do not desire to be limited, what is claimed as new and what it is desired to secure by Letters Patent is set forth in the appended claims.

1. A welded chain comprising regular links and one or more identifying welded links having a body of special configuration different from the regular links of said chain, said identifying link or links having the same resisting capacity as the other links of the chain.

2. A welded loading chain having identical links and at intervals an identifying welded link of different contour, the same forming a link of the chain, said identifying link or links having the same resisting capacity as the other links of the chain.

3. A welded chain comprising regular links, an identifying welded link having a body of special configuration different from the regular links of said chain, said identifying link being of substantially the same length of the other links of the chain and having substantially the same resisting capacity as the other links of the chain making a homogeneous chain and one which can be readily identified even though subjected to extreme wear and tear and covered with a thick coat of rust.

4. A chain having regular links made of round stock and at intervals an identifying link, a portion of which is round in cross-section and another portion is substantially rectangular in cross-section, said identifying link being of the same resisting capacity as the other links of the chain making a homogeneous chain and one which can be readily identified even though subjected to extreme wear and tear and covered with a thick coat of rust.

5. A coil loading chain made of a series of welded links, certain of which located at intervals along the length of the chain have a configuration different from the other links of the chain but all the links being of substantially the same resisting capacity resulting in a homogeneous chain which can be readily identified even after severe wear and tear.

6. A coil chain consisting of integral welded links of iron or steel, certain of which have a body of different configuration from the others, said links of different configuration having the same resisting capacity as the other links of the chain.

7. A coil loading chain consisting of integral welded links of regular substantially round cross-section and having identifying links of equal resisting capacity interposed at intervals, said identifying links being of substantially round cross-section at one end and having a substantially rectangular cross-section at the other end forming a flattened end of enlarged area substantially in the plane of the link upon which an identifying mark is placed.

8. A coil loading chain comprising regular welded links of substantially round cross-section and comprising identifying links interposed at intervals, said identifying links having a substantially round cross-section at one end of the same and having an enlarged flattened substantially rectangular cross-section at the other end of said links, the bearing surface in the enlarged flattened end of said identifying links adapted to provide regular bearing surfaces for the adjacent links and the enlarged flat identifying surface being provided substantially in the plane of said links and identifying marks placed on said flattened surfaces.

9. A welded coil loading chain having regular round links and at intervals a welded identifying link of the same resisting capacity as the other links of the chain, a portion of the body of said identifying link being round in cross-section and another portion substantially rectangular in cross-section, two of the sides of the rectangular portion being formed at an angle to each other.

10. A welded loading chain comprising regular links and one or more identifying welded links having a body of special configuration different from the regular links of said chain, the internal diameter of said identifying link being just sufficient to permit free movement of the ends of the adjacent links of the chain, said identifying link or links having the same resisting capacity as the other links of the chain.

11. A coil loading chain consisting of integral welded links of iron or steel, certain of which have a body of different configuration from the others, the internal diameter of the links of different configuration being merely sufficient for the free movement of the ends of the adjacent links of the chain, the external diameter of the links of different configuration being substantially the same as that of the other links of the chain, said links of different configuration having the same resisting capacity as the other links of the chain.

HENRY B. NEWHALL.

Witnesses:
ALAN M. JOHNSON,
HARRY L. DUNCAN.